(12) United States Patent
Yanagawa

(10) Patent No.: US 11,292,428 B2
(45) Date of Patent: Apr. 5, 2022

(54) WEBBING TAKE-UP DEVICE

(71) Applicant: KABUSHIKI KAISHA TOKAI-RIKA-DENKI-SEISAKUSHO, Aichi (JP)

(72) Inventor: Wataru Yanagawa, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 158 days.

(21) Appl. No.: 16/755,759

(22) PCT Filed: Sep. 20, 2018

(86) PCT No.: PCT/JP2018/034918
§ 371 (c)(1),
(2) Date: Apr. 13, 2020

(87) PCT Pub. No.: WO2019/077935
PCT Pub. Date: Apr. 25, 2019

(65) Prior Publication Data
US 2020/0324733 A1 Oct. 15, 2020

(30) Foreign Application Priority Data
Oct. 16, 2017 (JP) .............................. JP2017-200178

(51) Int. Cl.
*B60R 22/46* (2006.01)
(52) U.S. Cl.
CPC ................................... *B60R 22/46* (2013.01)

(58) Field of Classification Search
CPC ................ B60R 22/46; B60R 22/4633; B60R 2022/4642
See application file for complete search history.

(56) References Cited

U.S. PATENT DOCUMENTS

| | | | |
|---|---|---|---|
| 7,988,084 B2 * | 8/2011 | Lombarte | B60R 22/4628 242/374 |
| 8,220,735 B2 * | 7/2012 | Wang | B60R 22/4676 242/374 |
| 8,584,980 B2 * | 11/2013 | Clute | B60R 22/3413 242/379.1 |
| 2014/0145020 A1 | 5/2014 | Gentner et al. | |

FOREIGN PATENT DOCUMENTS

| | | |
|---|---|---|
| DE | 10356180 A1 | 7/2004 |
| JP | 2014-500178 A | 1/2014 |

* cited by examiner

*Primary Examiner* — Sang K Kim
(74) *Attorney, Agent, or Firm* — Robert Calderon; Safran & Cole P.C.

(57) ABSTRACT

A webbing take-up device is provided with a spool on which a webbing to be applied to a vehicle occupant is taken up, due to the spool rotating in a take-up direction. The webbing take-up device is also provided with a lock base and a connecting member that are integrally rotatable with the spool. The lock base and connecting member are provided with a lock base-side flange portion and a connecting member-side flange portion, which are disposed opposite to one another in a rotation axis direction of the spool, and with lock base-side second engaging teeth and connecting member-side second engaging teeth.

4 Claims, 7 Drawing Sheets

WEBBING TAKE-UP DEVICE

CROSS-REFERENCE TO RELATED APPLICATIONS

The present application is a U.S. National Phase of PCT/JP2018/034918 filed on Sep. 20, 2018, claiming priority under 35 USC 119 from Japanese Patent Application No. 2017-200178 filed Oct. 16, 2017, the disclosure of which is incorporated by reference herein.

TECHNICAL FIELD

The present invention relates to a webbing take-up device.

BACKGROUND ART

Japanese Patent Application National Publication No. 2014-500178 discloses a webbing take-up device equipped with a pre-tensioner mechanism that takes up a webbing onto a spool by rotating the spool in a take-up direction at a time of emergency of a vehicle.

In the pre-tensioner mechanism recited in Japanese Patent Application National Publication No. 2014-500178, the webbing may be taken up onto the spool by a moving member, which is moved by activation of a gas generator, engaging with engaging teeth of a rotor that is rotatable integrally with the spool.

With a view to reducing power output and size of the gas generator and so forth, it is desirable to enable an increase in a torque with which the moving member rotates the rotor while suppressing an increase in size of the rotor.

SUMMARY OF INVENTION

Technical Problem

In consideration of the circumstances described above, an object of the present invention is to provide a webbing take-up device that may increase a torque with which a moving member rotates a rotor while suppressing an increase in size of the rotor.

Solution to Problem

A webbing take-up device according to a first aspect includes: a spool on which a webbing to be applied to a vehicle occupant is taken up, due to the spool rotating in a take-up direction; and a rotor that is integrally rotatable with the spool, the rotor including a pair of opposing portions disposed opposite to one another in a rotation axis direction of the spool, and axial direction engaging teeth that protrude from at least one of the pair of opposing portions toward the side thereof at which the other of the opposing portions is disposed, wherein the rotor is rotated and the spool is rotated in the take-up direction, due to a moving member moving and engaging with the axial direction engaging teeth.

In a webbing take-up device according to a second aspect, in the webbing take-up device according to the first aspect, the rotor includes: a connecting portion that links the pair of opposing portions in the rotation axis direction of the rotor; and diametric direction engaging teeth that protrude from the connecting portion toward a rotation diameter direction outer side of the rotor, the moving member engaging with the diametric direction engaging teeth.

In a webbing take-up device according to a third aspect, in the webbing take-up device according to the first aspect or second aspect, recess portions are formed in the opposing portion at protrusion direction base end sides of the axial direction engaging teeth, the recess portions being indented toward an opposite side from the protrusion direction of the axial direction engaging teeth, and when the moving member engages with the axial direction engaging teeth, portions of the moving member that are engaged with the axial direction engaging teeth are deformed.

In a webbing take-up device according to a fourth aspect, in the webbing take-up device according to the second aspect, a protrusion height of the axial direction engaging teeth is smaller than a protrusion height of the diametric direction engaging teeth.

Advantageous Effects of Invention

According to the webbing take-up device according to the first aspect, the rotor is rotated by the moving member being moved and engaged with the axial direction engaging teeth of the rotor. In consequence, the spool is rotated in the take-up direction and the webbing is taken up onto the spool. In the webbing take-up device according to this first aspect, the axial direction engaging teeth with which the moving member engages are provided at one or both of the pair of opposing portions of the rotor. In this structure, the moving member moves between the pair of opposing portions and the moving member engages in the axial direction (the rotation axis direction) with the axial direction engaging teeth. Therefore, the moving member and the axial direction engaging teeth may be engaged at a position further to the diametric direction outer side than in a structure in which a moving member engages with engaging teeth provided at a rotation center side of a rotor. As a result, a torque with which the moving member rotates the rotor may be increased even while an increase in size of the rotor is suppressed.

According to the webbing take-up device according to the second aspect, the rotor is rotated by the moving member being moved and engaged with the axial direction engaging teeth and with the diametric direction engaging teeth of the rotor. Thus, because the axial direction engaging teeth and diametric direction engaging teeth with which the moving member engages in the axial direction (the rotation axis direction) and the diametric direction (the rotation diameter direction) are provided, locations of engagement between the moving member and the rotor may be increased in number.

According to the webbing take-up device according to the third aspect, when the moving member is moved and engaged with the axial direction engaging teeth of the rotor, portions of the moving member that are engaged with the axial direction engaging teeth are deformed. Because, in the webbing take-up device according to this third aspect, the recess portions are formed in the opposing portion(s) at the protrusion direction base end sides of the axial direction engaging teeth, portions of the moving member that are deformed by the engagement with the axial direction engaging teeth may escape into the recess portions formed in the opposing portion.

According to the webbing take-up device according to the fourth aspect, even though the protrusion height of the axial direction engaging teeth is set to a smaller protrusion height than the protrusion height of the diametric direction engaging teeth, load transmission efficiency from the moving member to the rotor may be assured.

DETAILED DESCRIPTION

Figure 1:
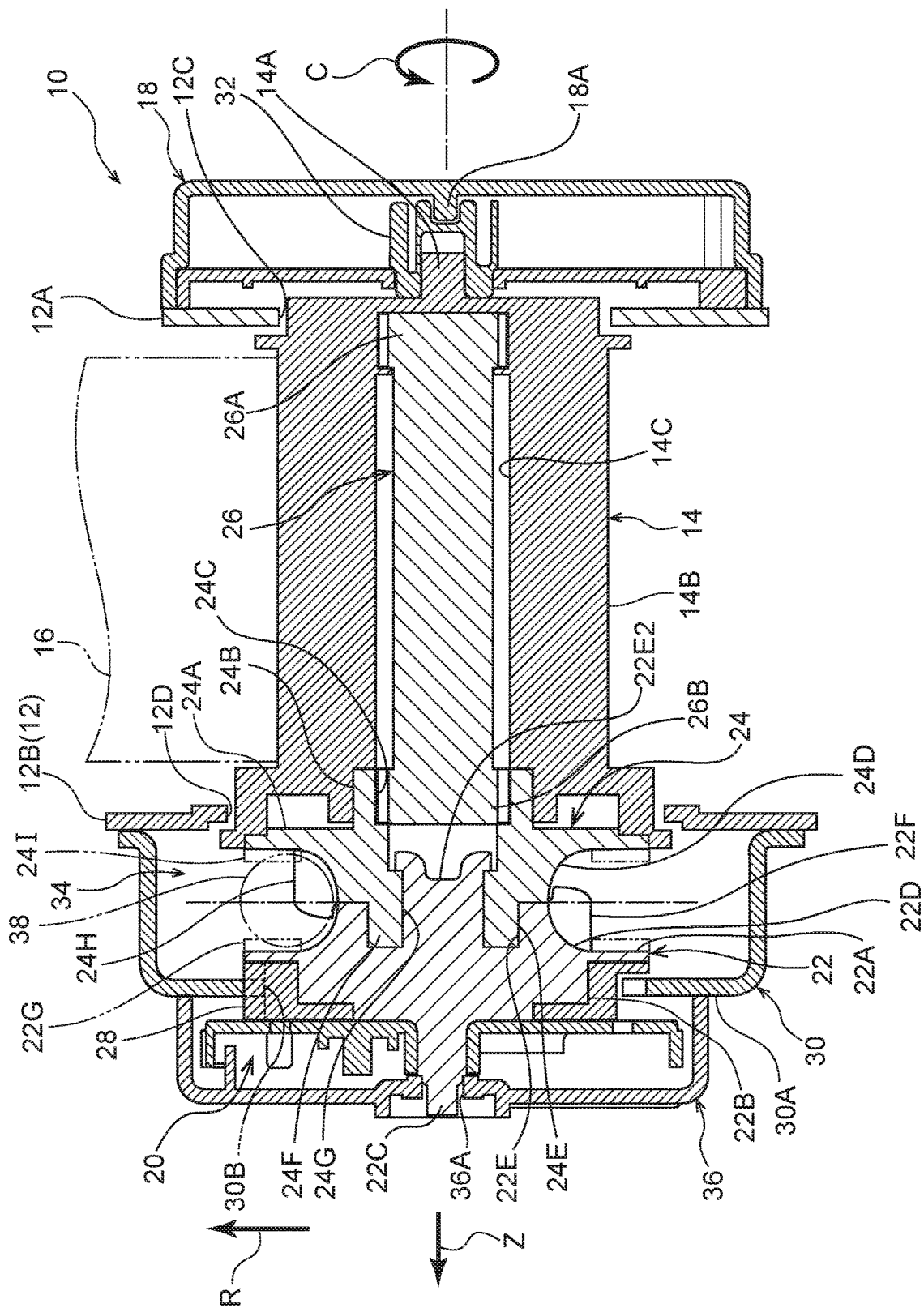
FIG. 1 is a sectional diagram showing a section in which a webbing take-up device according to a present exemplary embodiment is cut along a rotation axis direction of a spool.

A webbing take-up device according to an exemplary embodiment of the present invention is described using FIG. 1 to FIG. 4. The directions of arrow Z, arrow R and arrow C that are shown as appropriate in the drawings indicate, respectively, a rotation axis direction, rotation diameter direction and rotation circumference direction of a spool. Where simply an axial direction, diametric direction and circumferential direction are referred to below without being particularly specified, these refer to the rotation axis direction, rotation diameter direction and rotation circumference direction of the spool.

As shown in FIG. 1, a webbing take-up device 10 is equipped with a frame 12 fabricated of metal. The frame 12 is fixed to a pillar that structures a vehicle body framework of a vehicle, a seat cushion frame that structures a framework of a vehicle seat, or the like. The frame 12 is provided with a leg plate 12A and a leg plate 12B that are disposed to be spaced apart in the axial direction and oppose one another. Circular insertion holes 12C and 12D are formed in the leg plate 12A and leg plate 12B. Portions of a spool 14, which is described below, are inserted through the insertion holes 12C and 12D.

The spool 14 is fabricated of metal and formed in a substantially circular tube shape, most of which is disposed between the leg plate 12A and leg plate 12B of the frame 12. An axle portion 14A is provided at an end portion at another axial direction end side of the spool 14 (the opposite side from the direction of arrow Z). A bearing portion 18A is provided in a spring housing 18, which is described below. The axle portion 14A is supported at the bearing portion 18A via a spiral spring anchoring member 32. The spool 14 is further provided with a take-up portion 14B onto which a webbing 16 is taken up. The webbing 16 is formed in a long, narrow belt shape; a length direction base end portion of the webbing 16 is anchored at the take-up portion 14B. When the spool 14 is rotated in a take-up direction (the direction of arrow C), the webbing 16, starting from the length direction base end side thereof, is taken up onto the take-up portion 14B of the spool 14. When the webbing 16 is pulled out from the spool 14, the spool 14 is rotated in a pull-out direction (the opposite direction to arrow C). A torsion shaft insertion hole 14C is formed in an axial central portion of the spool 14. A torsion shaft 26, which is described below, is inserted into the torsion shaft insertion hole 14C. One axial direction side of the torsion shaft insertion hole 14C is open, and the another axial direction side of the torsion shaft insertion hole 14C is closed off.

A length direction distal end side of the webbing 16 extends from the spool 14 toward the vehicle upper side. The length direction distal end side of the webbing 16 passes through a slit hole formed in a through-anchor (not shown in the drawings) at the vehicle upper side of the frame 12, and is turned back toward the vehicle lower side.

The length direction distal end side of the webbing 16 is anchored at an anchor plate (not shown in the drawings). The anchor plate is formed of a metal plate of steel or the like, and is fixed to a floor portion of the vehicle (not shown in the drawings), a framework member of the seat (not shown in the drawings) corresponding with the present webbing take-up device 10, or the like.

A seatbelt device for a vehicle in which the present webbing take-up device 10 is employed is equipped with a buckle device (not shown in the drawings). The buckle device is provided at a vehicle width direction inner side of the seat at which the present webbing take-up device 10 is employed. In a state in which the webbing 16 is wrapped round the body of a vehicle occupant sitting on the seat, a tongue (not shown in the drawings) provided at the webbing 16 is engaged with the buckle device. Thus, the webbing 16 is applied to the body of the vehicle occupant.

The spring housing 18, which is fabricated of resin, includes the aforementioned bearing portion 18A. The spring housing 18 is provided at an outer face side of the leg plate 12A of the frame 12 (outside the frame 12). A spiral spring (not shown in the drawings) is provided inside the spring housing 18. One end portion of the spiral spring is anchored at the spiral spring anchoring member 32. The spool 14 is urged in the take-up direction (the direction of arrow C) by an urging force of the spiral spring.

A lock mechanism 20 is provided at an outer face side of the leg plate 12B of the frame 12 (outside the frame 12). The lock mechanism 20 is provided with a lock base 22 fabricated of metal, which structures a portion of a rotor, and a lock pawl 28 fabricated of metal, which is supported at the lock base 22. The lock base 22 is provided coaxially with the spool 14 at the one axial direction side relative to the spool 14. The lock base 22 is linked with the spool 14 via a connecting member 24 fabricated of metal, which structures another portion of the rotor, and the torsion shaft 26. Thus, the lock base 22 can be rotated integrally with the spool 14.

The lock mechanism 20 is equipped with a sensor apparatus (not shown in the drawings). The sensor apparatus is activated at a time of emergency of the vehicle, such as during a collision of the vehicle, during a sudden deceleration or the like. When the sensor apparatus is activated, rotation of the lock base 22 in the pull-out direction (the pull-out direction of the spool 14) is restricted, as is described in more detail below.

A cover plate 30 fabricated of metal is fixed to the leg plate 12B of the frame 12. The cover plate 30 and the leg plate 12B of the frame 12 form a rack accommodation portion 34, in which a large portion of the lock base 22 and the connecting member 24 are disposed.

The cover plate 30 is provided with a plate portion 30A, which is recessed toward the opposite side from the side thereof at which the frame 12 is disposed. The plate portion 30A is disposed to oppose the leg plate 12B of the frame 12 in the axial direction. A ratchet hole 30B is formed penetrating through the plate portion 30A. The lock base 22 of the lock mechanism 20 penetrates through the ratchet hole 30B of the cover plate 30. When the sensor apparatus of the lock mechanism 20 is activated and the lock pawl 28 attached to the lock base 22 moves to the diametric direction outer side of the lock base 22, the lock pawl 28 meshes with ratchet teeth of the ratchet hole 30B of the cover plate 30. As a result, rotation of the lock base 22 in the pull-out direction is restricted. Hence, rotation in the pull-out direction of the spool 14 that is linked with the lock base 22 via the connecting member 24 and the torsion shaft 26 is restricted.

The webbing take-up device 10 is also equipped with the torsion shaft 26. The torsion shaft 26 is formed in a rod shape, is accommodated in the torsion shaft insertion hole 14C of the spool 14, and is arranged along the axial direction of the spool 14. An end portion 26A at one side of the torsion shaft 26 is anchored to the spool 14. An end portion 26B at another side of the torsion shaft 26 is anchored at the connecting member 24 and thus linked with the lock base 22. When rotation of the lock base 22 in the pull-out direction is being restricted, a length direction middle portion of the torsion shaft 26 is deformed by twisting. Thus, rotation of the webbing 16 in the pull-out direction of the spool 14 is tolerated.

Now, detailed structures of the lock base 22 and the connecting member 24, which serve as the rotor, are described.

Figure 2:
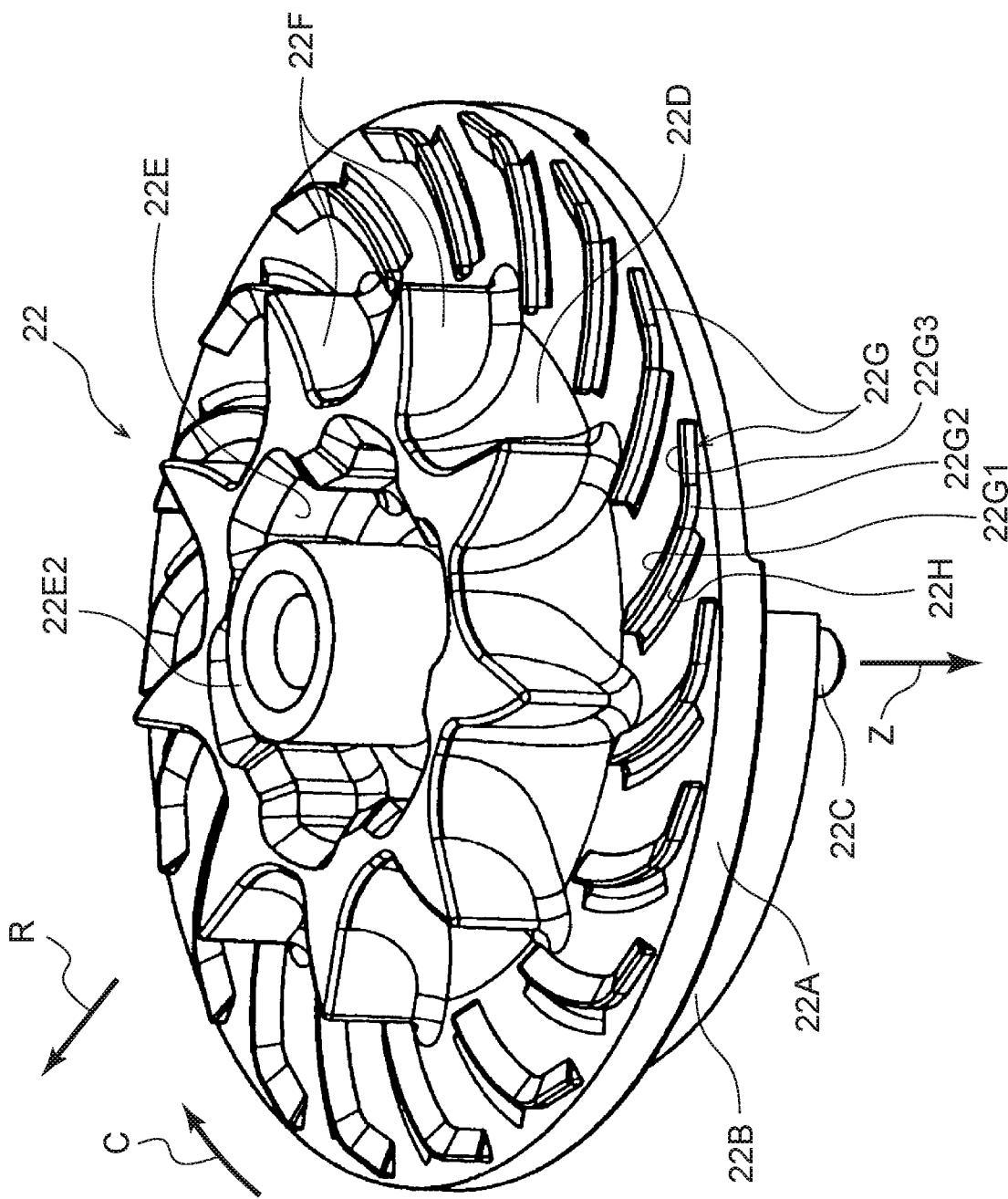
FIG. 2 is a perspective view of a lock base viewed from another axial direction side.

As shown in FIG. 1 and FIG. 2, the lock base 22 is provided with a lock base-side flange portion 22A, which serves as an opposing portion. The lock base-side flange portion 22A is formed in a circular plate shape that has a thickness direction in the axial direction and extends in the diametric direction. The lock base 22 is further provided with a circular column portion 22B in a substantially circular column shape. The circular column portion 22B protrudes to the one axial direction side from the lock base-side flange portion 22A. A portion at which the lock pawl 28 is to be disposed is cut away from the circular column portion 22B. A rod-shaped shaft portion 22C protrudes to the one axial direction side from an axial central portion of the circular column portion 22B. A lock mechanism accommodating cover 36 is attached to the cover plate 30, and a bearing hole 36A is formed in the lock mechanism accommodating cover 36. The shaft portion 22C is inserted into the bearing hole 36A. Thus, the shaft portion 22C is supported at an inner periphery face of the bearing hole 36A.

The lock base 22 is provided with a lock base-side tubular portion 22D that protrudes to the another axial direction side from the lock base-side flange portion 22A. The lock base-side tubular portion 22D, which serves as a connecting portion, is formed such that an outer diameter of a diametric direction outer side face thereof decreases toward the another axial direction side. A lock base-side spline 22E in a spline shape is formed at an inner periphery portion of the lock base-side tubular portion 22D.

The lock base 22 is further provided with a plural number of lock base-side first engaging teeth 22F that serve as diametric direction engaging teeth. The lock base-side first engaging teeth 22F protrude to the diametric direction outer side from the lock base-side tubular portion 22D. End portions at the one axial direction side of the lock base-side first engaging teeth 22F are joined with the lock base-side flange portion 22A. The plural lock base-side first engaging teeth 22F are disposed at equal spacings in the circumferential direction. A width dimension (a dimension in the circumferential direction) of each lock base-side first engaging tooth 22F progressively narrows toward the diametric direction outer side. Thus, distal end portions (end portions at the diametric direction outer side) of the lock base-side first engaging teeth 22F are tapered.

A lock base-side core portion 22E2 is provided at an axial central portion of the lock base-side tubular portion 22D. The lock base-side core portion 22E2 is formed in a tubular shape with a larger diameter than the shaft portion 22C.

Figure 3:
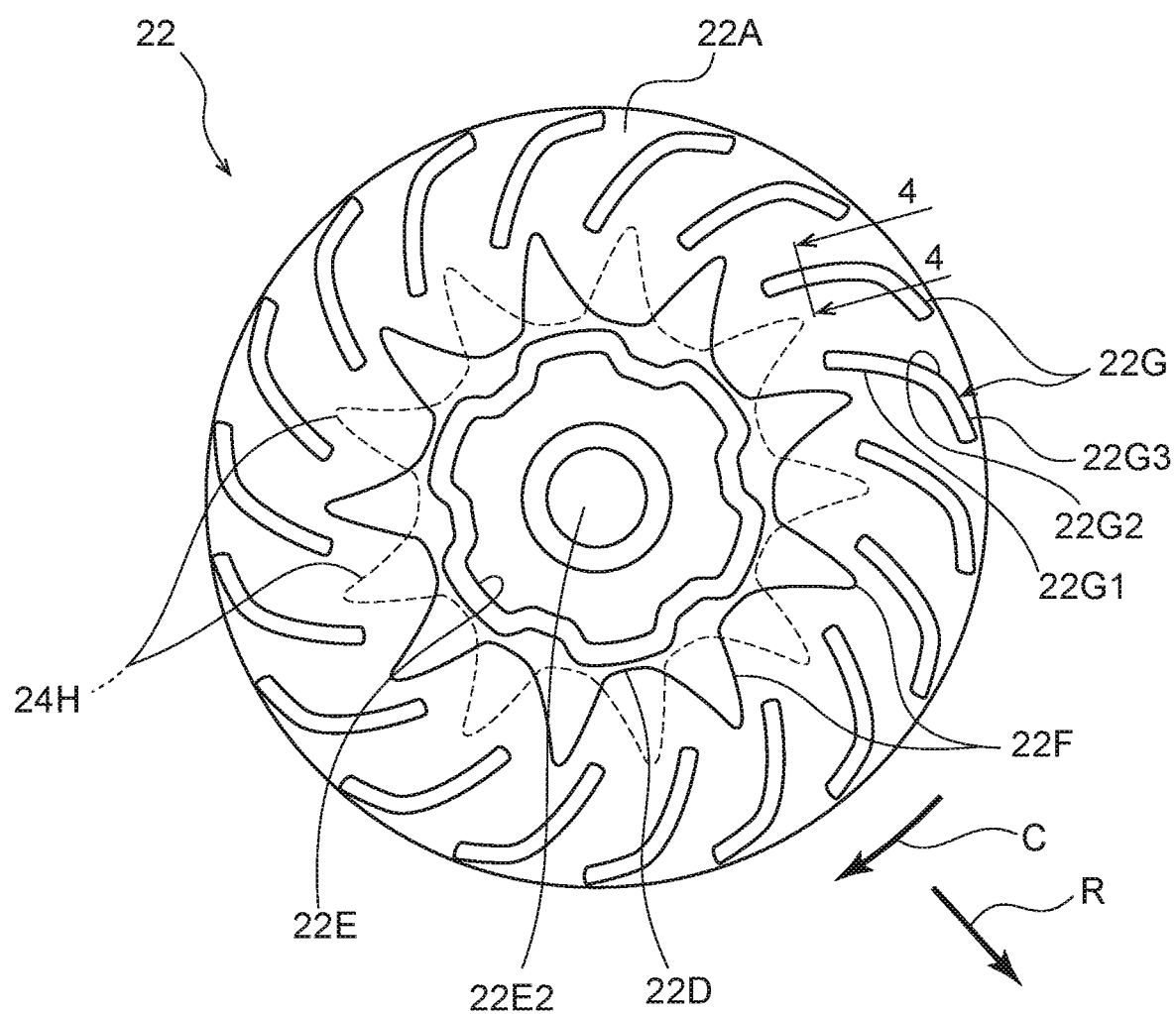
FIG. 3 is a plan view of the lock base viewed from the another axial direction side.
Figure 4:
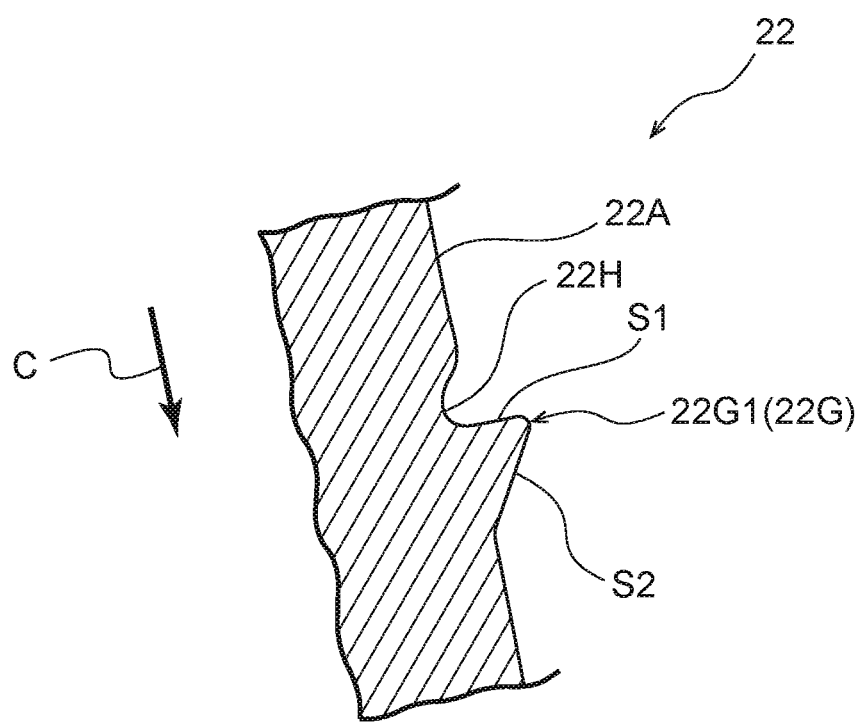
FIG. 4 is a magnified perspective view showing a magnified section in which the lock base is cut along line 4-4 shown in FIG. 3.

As shown in FIG. 2 to FIG. 4, the lock base 22 is provided with plural lock base-side second engaging teeth 22G that serve as axial direction engaging teeth. The lock base-side second engaging teeth 22G protrude to the another axial direction side from a face at the another axial direction side of an outer periphery portion of the lock base-side flange portion 22A. A protrusion height of each lock base-side second engaging tooth 22G (a protrusion height from the lock base-side flange portion 22A) is specified to be a smaller protrusion height than a protrusion height of the lock base-side first engaging teeth 22F (a maximum protrusion height of the lock base-side first engaging teeth 22F from the lock base-side tubular portion 22D).

Each lock base-side second engaging tooth 22G is provided with a first extension portion 22G1, a second extension portion 22G3, and a curved portion 22G2 therebetween. Viewed in the axial direction, the first extension portion 22G1 is angled to a circumferential direction one side toward the diametric direction outer side. At the curved portion 22G2, the lock base-side second engaging tooth 22G gently curves toward the circumferential direction one side from an end portion at the diametric direction outer side of the first extension portion 22G1. Hence, the second extension portion 22G3 extends toward the diametric direction outer side and the circumferential direction one side.

A section of the lock base-side second engaging tooth 22G cut along a direction orthogonal to the length direction thereof (the section depicted in FIG. 4) is formed with a substantially triangular cross section. A face at the circumferential direction another side of the lock base-side second engaging tooth 22G is formed as a perpendicular surface S1 that extends in a direction orthogonal to the face at the diametric direction another side of the lock base-side flange portion 22A. A face at the circumferential direction one side of the lock base-side second engaging tooth 22G is formed as an inclined surface S2 that is angled relative to the face at the diametric direction another side of the lock base-side flange portion 22A.

As shown in FIG. 4, a recess portion 22H is formed in the lock base-side flange portion 22A at the base end side of the perpendicular surface S1 side of the first extension portion 22G1 of each lock base-side second engaging tooth 22G. The recess portion 22H is indented toward the one axial direction side.

As shown in FIG. 1, the connecting member 24 is provided with a connecting member-side flange portion 24A that serves as an opposing portion corresponding with the lock base-side flange portion 22A of the lock base 22. The connecting member 24 is further provided with a torsion shaft engaging portion 24B formed in a circular tube shape. The torsion shaft engaging portion 24B protrudes to the another axial direction side from the connecting member-side flange portion 24A. A spline-shaped torsion shaft engaging spline 24C is formed at an inner periphery portion of the torsion shaft engaging portion 24B. The end portion 26B at the another side of the torsion shaft 26 is engaged with the torsion shaft engaging spline 24C.

The connecting member 24 is further provided with a connecting member-side tubular portion 24D, which serves as the connecting portion, protruding to the one axial direction side from the connecting member-side flange portion 24A. The connecting member-side tubular portion 24D corresponds with the lock base-side tubular portion 22D of the lock base 22. A connecting member-side core portion 24F is provided at an inner periphery portion of the connecting member-side tubular portion 24D. The connecting member-side core portion 24F protrudes to the one axial direction side, and a connecting member-side spline 24E in a spline shape is formed at the connecting member-side core portion 24F. Outer periphery portions of the connecting member-side spline 24E are engaged with the lock base-side spline 22E of the lock base 22. An insertion hole 24G is formed in an axial central portion of the connecting member-side core portion 24F. The lock base-side core portion 22E2 of the lock base 22 is inserted into the insertion hole 24G. The lock base 22 and the connecting member 24 are joined to be integrally rotatable by the lock base-side core portion 22E2 of the lock base 22 being inserted into the insertion hole 24G of the connecting member-side core portion 24F and the connecting member-side spline 24E being engaged with the lock base-side spline 22E. In the present exemplary embodiment, a distal end portion of the lock base-side core portion 22E2 of the lock base 22 is crimped (flattened), such that the joining of the lock base 22 with the connecting member 24 will not disengage. In the present exemplary embodiment, a spacing in the axial direction between the lock base-side flange portion 22A of the lock base 22 and the connecting member-side flange portion 24A of the connecting member 24 in the state in which the lock base 22 and the connecting member 24 are joined is specified to be a spacing substantially the same as an outer diameter of a rack 38, which is described below The connecting member 24 is further provided with connecting member-side first engaging teeth 24H that serve as diametric direction engaging teeth and with connecting member-side second engaging teeth 24I that serve as axial direction engaging teeth. The connecting member-side first engaging teeth 24H and connecting member-side second engaging teeth 24I correspond with, respectively, the lock base-side first engaging teeth 22F and lock base-side second engaging teeth 22G of the lock base 22. In the state in which the lock base 22 and the connecting member 24 are joined, the lock base-side first engaging teeth 22F and the connecting member-side first engaging teeth 24H are arranged alternatingly in the circumferential direction and are disposed at equal spacings. Furthermore, in the state in which the lock base 22 and the connecting member 24 are joined, the lock base-side second engaging teeth 22G and the connecting member-side second engaging teeth 24I are arranged alternatingly in the circumferential direction and are disposed at equal spacings. Although not shown in the drawings, recess portions are formed in the connecting member-side flange portion 24A of the connecting member 24 that correspond with the recess portions 22H formed in the lock base-side flange portion 22A of the lock base 22.

As shown in FIG. 1, the rack 38, which serves as a moving member, engages with the connecting member-side first engaging teeth 24H and the lock base-side first engaging teeth 22F. The rack 38 is formed in a rod shape of a softer material than the lock base 22 and the connecting member 24 (for example, of a synthetic resin). The rack 38 is disposed inside a pipe, which is not shown in the drawings. At a time of emergency of the vehicle, the rack 38 is moved at the inner side of the pipe and the inner side of the cover plate 30 (inside the rack accommodation portion 34) by pressure of gas supplied from a micro gas generator, which is not shown in the drawings.

—Operation and Effects of the Present Exemplary Embodiment—

Now, operation and effects of the present exemplary embodiment are described.

According to the webbing take-up device 10 according to the present exemplary embodiment as shown in FIG. 1, when the lock pawl 28 meshes with the ratchet teeth of the ratchet hole 30B during a collision of the vehicle, which is a mode of a time of emergency of the vehicle, rotation of the lock base 22 in the pull-out direction (the opposite direction to arrow C) is restricted.

Figure 5:
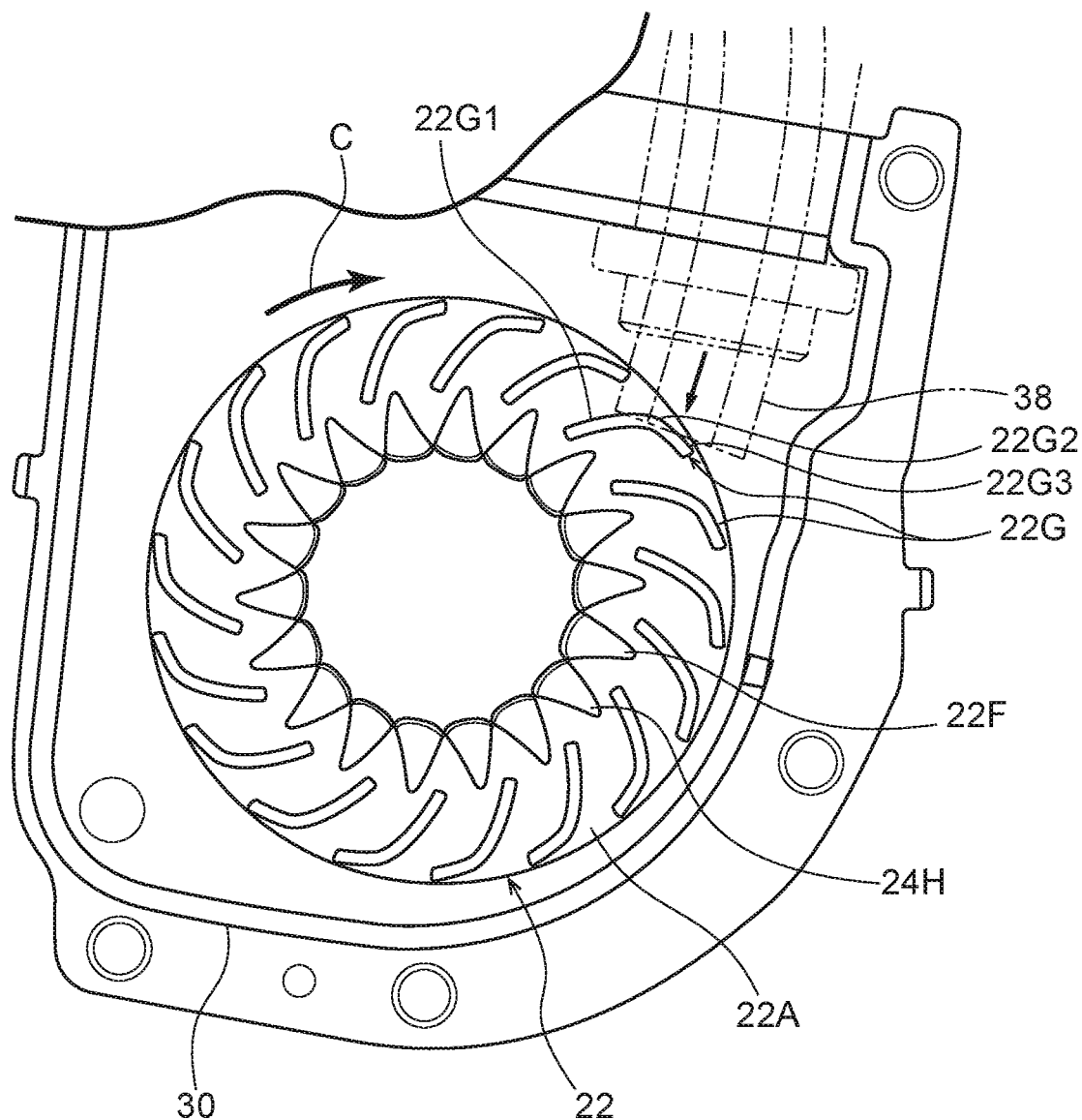
FIG. 5 is a side view showing a state in which a rack initially engages with axial direction engaging teeth.
Figure 6:
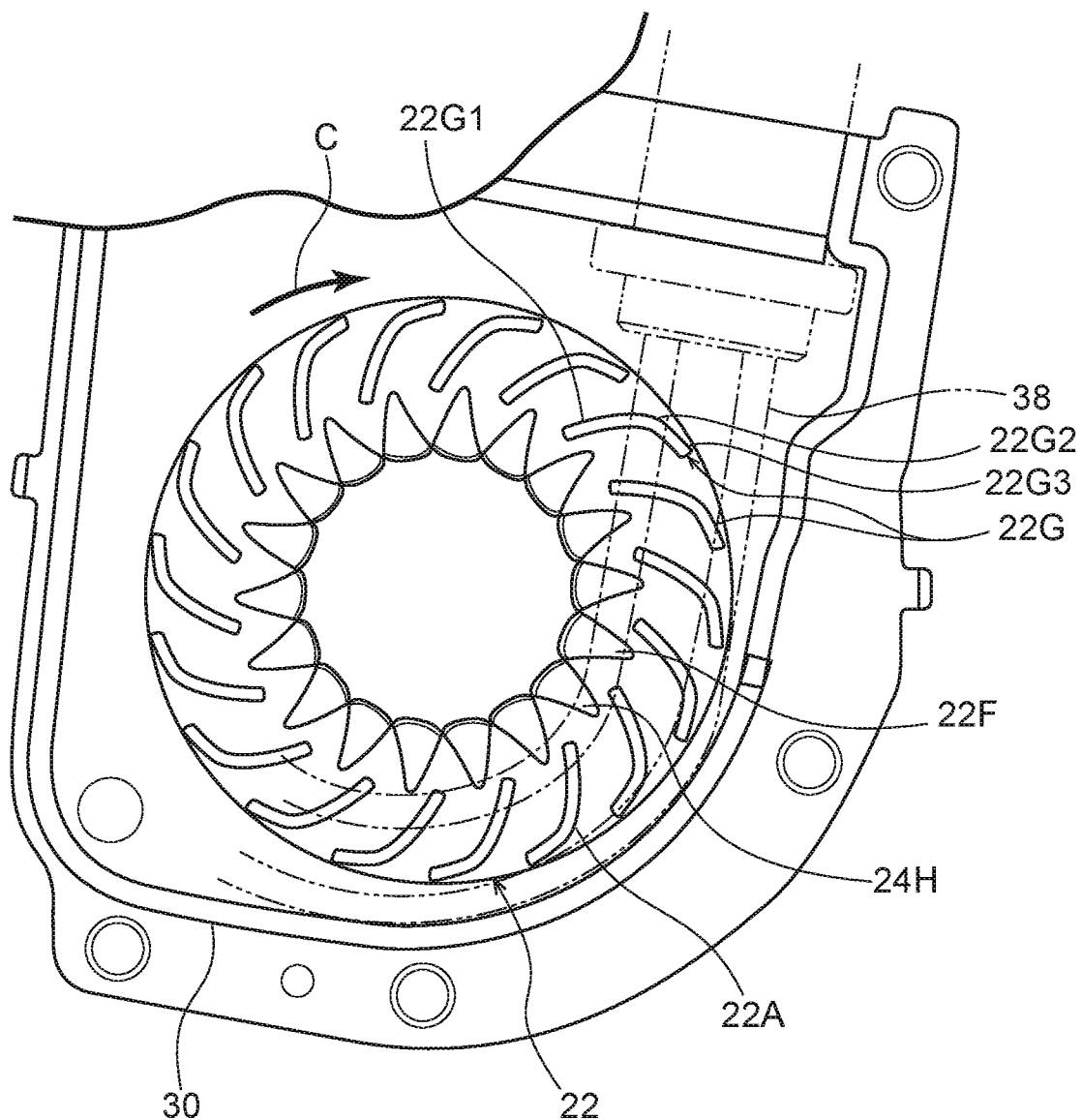
FIG. 6 is a side view showing a state in which the rack is engaged with the axial direction engaging teeth and with diametric direction engaging teeth.

As shown in FIG. 1, FIG. 5 and FIG. 6, when the micro gas generator, which is not shown in the drawings, is activated during the collision of the vehicle, high-pressure gas generated by the micro gas generator is instantaneously supplied into the pipe in which the rack 38 is disposed. The rack 38 is moved by the pressure of this gas and passes between the lock base-side flange portion 22A of the lock base 22 and the connecting member-side flange portion 24A of the connecting member 24.

When the rack 38 passes along the lock base-side flange portion 22A of the lock base 22 and the connecting member-side flange portion 24A of the connecting member 24, the lock base-side second engaging teeth 22G of the lock base 22 and the connecting member-side second engaging teeth 24I of the connecting member 24 bite into the rack 38, deforming portions of the rack 38. In addition, the lock base-side first engaging teeth 22F of the lock base 22 and the connecting member-side first engaging teeth 24H of the connecting member 24 bite into the rack 38, deforming portions of the rack 38. Thus, kinetic energy of the rack 38 may be transferred to the lock base 22 and the connecting member 24.

When the rack 38 moves in the state in which the lock base-side first engaging teeth 22F of the lock base 22 and the connecting member-side first engaging teeth 24H of the connecting member 24 are biting into the rack 38, the connecting member 24 and the lock base 22 rotate in the take-up direction (the direction of arrow C), together with the spool 14. As a result, the webbing 16 is taken up onto the take-up portion 14B of the spool 14 and a restraining force on the vehicle occupant from the webbing 16 is increased.

In the state in which rotation of the lock base 22 in the pull-out direction is restricted, when the body of the vehicle occupant pulls on the webbing 16 and a rotary force on the spool 14 in the pull-out direction according to this pulling force is greater than a torsion withstand load (a deformation withstand load) of the torsion shaft 26, the torsion shaft 26 twists (deforms). As a result, rotation of the spool 14 in the pull-out direction is tolerated by the twisting of the torsion shaft 26, and pull-out of the webbing 16 from the spool 14 is tolerated. Thus, energy (kinetic energy of the vehicle occupant) corresponding to the amount of pull-out of the webbing 16 from the spool 14 is absorbed by the deformation of the torsion shaft 26.

In the present exemplary embodiment, the lock base-side first engaging teeth 22F of the lock base 22 and the connecting member-side first engaging teeth 24H of the connecting member 24 are provided in addition to the lock base-side second engaging teeth 22G of the lock base 22 and the connecting member-side second engaging teeth 24I of the connecting member 24. Therefore, locations of biting (engagement) between the rack 38 and the lock base 22 and rack 38 may be increased in number.

Moreover, in the present exemplary embodiment, the lock base-side second engaging teeth 22G of the lock base 22 and the connecting member-side second engaging teeth 24I of the connecting member 24 are provided further to the diametric direction outer side than the lock base-side first engaging teeth 22F of the lock base 22 and the connecting member-side first engaging teeth 24H of the connecting member 24. Therefore, the rack 38 and the lock base-side second engaging teeth 22G and the connecting member-side second engaging teeth 24I of the connecting member 24 may be caused to bite at locations further to the diametric direction outer side than in a structure in which the rack 38 is bitten (engaged) only by the lock base-side first engaging teeth 22F of the lock base 22 and the connecting member-side first engaging teeth 24H of the connecting member 24. As a result, a torque with which the rack 38 rotates the lock base 22 and the connecting member 24 may be increased. In other words, a load transmission efficiency from the rack 38 to the lock base 22 and connecting member 24 may be improved. The meaning of the term "load transmission efficiency" includes an amount of change of a rotation angle of the lock base 22 and connecting member 24 corresponding with a movement amount of the rack 38. Because the load transmission efficiency from the rack 38 to the lock base 22 and connecting member 24 may be improved, lengths of the rack 38 and of the pipe inside which the rack 38 is disposed may be shortened. As a result, the body of the webbing take-up device 10 may be reduced in size.

In the present exemplary embodiment, the rack 38 is bitten into by the lock base-side first engaging teeth 22F of the lock base 22 and the connecting member-side first engaging teeth 24H of the connecting member 24 after being bitten into by the lock base-side second engaging teeth 22G of the lock base 22 and the connecting member-side second engaging teeth 24I of the connecting member 24. Therefore, impacts that act on the lock base-side first engaging teeth 22F of the lock base 22 and the connecting member-side first engaging teeth 24H of the connecting member 24 when the rack 38 is bitten into by the lock base-side first engaging teeth 22F and connecting member-side first engaging teeth 24H may be moderated compared to a structure in which the lock base-side second engaging teeth 22G of the lock base 22 and the connecting member-side second engaging teeth 24I of the connecting member 24 are not provided.

Because the lock base-side first engaging teeth 22F of the lock base 22 and the connecting member-side first engaging teeth 24H of the connecting member 24 are provided in addition to the lock base-side second engaging teeth 22G of the lock base 22 and the connecting member-side second engaging teeth 24I of the connecting member 24, the load transmission efficiency from the rack 38 to the lock base 22 and connecting member 24 may be set to a desired load transmission efficiency even if the protrusion heights of the respective teeth are reduced. In particular in the present exemplary embodiment, the load transmission efficiency from the rack 38 to the lock base 22 and connecting member 24 may be set to a desired load transmission efficiency even when the protrusion heights of the lock base-side second engaging teeth 22G and the connecting member-side second engaging teeth 24I are specified to be smaller protrusion heights than the protrusion heights of the lock base-side first engaging teeth 22F and the connecting member-side first engaging teeth 24H. Moreover, impact endurance when the respective teeth bite into the rack 38 may be assured even if breadths of the respective teeth are reduced.

In the present exemplary embodiment, the recess portions 22H are formed in the lock base-side flange portion 22A of the lock base 22 at the base end sides of the first extension portions 22G1 of the lock base-side second engaging teeth 22G (see FIG. 4), and the recess portions with similar structures are formed in the connecting member-side flange portion 24A of the connecting member 24. Therefore, when the lock base-side second engaging teeth 22G of the lock base 22 and the connecting member-side second engaging teeth 24I of the connecting member 24 bite into the rack 38, deformed portions of the rack 38 may escape into the recess portions 22H. As a result, contact areas between the rack 38 and the lock base 22 and connecting member 24 may be increased, and the load transmission efficiency from the rack 38 to the lock base 22 and connecting member 24 may be improved even further.

In the present exemplary embodiment, each lock base-side second engaging tooth 22G includes the first extension portion 22G1, the curved portion 22G2 and the second extension portion 22G3 and is gently curved substantially in an "L" shape, and the connecting member-side second engaging teeth 24I are similarly curved. Therefore, when the rack 38 initially engages with the lock base-side second engaging teeth 22G and connecting member-side second engaging teeth 24I as illustrated in FIG. 5, a leading end side of the rack 38 may be guided toward the diametric direction outer side by the curved portions 22G2 and the second extension portions 22G3. Thus, when the rack 38 initially engages with the lock base-side second engaging teeth 22G and connecting member-side second engaging teeth 24I, inflection of the rack 38 toward the diametric direction inner side may be suppressed.

Moreover, because the lock base-side second engaging teeth 22G and the connecting member-side second engaging teeth 24I are curved as described above, while the rack 38 is moving, further deformation of peripheral edge portions of portions of the rack 38 that have already been deformed by the lock base-side second engaging teeth 22G and connecting member-side second engaging teeth 24I is suppressed. As a result, losses (losses of kinetic energy of the rack) due to deformation of the peripheral edge portions of the portions of the rack 38 that have already been deformed by the lock base-side second engaging teeth 22G and connecting member-side second engaging teeth 24I may be moderated.

In the present exemplary embodiment, an example is described in which the lock base-side first engaging teeth 22F of the lock base 22 and the connecting member-side first engaging teeth 24H of the connecting member 24 are provided in addition to the lock base-side second engaging teeth 22G of the lock base 22 and the connecting member-side second engaging teeth 24I of the connecting member 24, but the present invention is not limited thus. For example, structures are possible in which the lock base-side first engaging teeth 22F of the lock base 22 and the connecting member-side first engaging teeth 24H of the connecting member 24 are not provided. Further, structures are possible in which one or the other of the lock base-side second engaging teeth 22G of the lock base 22 and the connecting member-side second engaging teeth 24I of the connecting member 24 are not provided.

Figure 7:
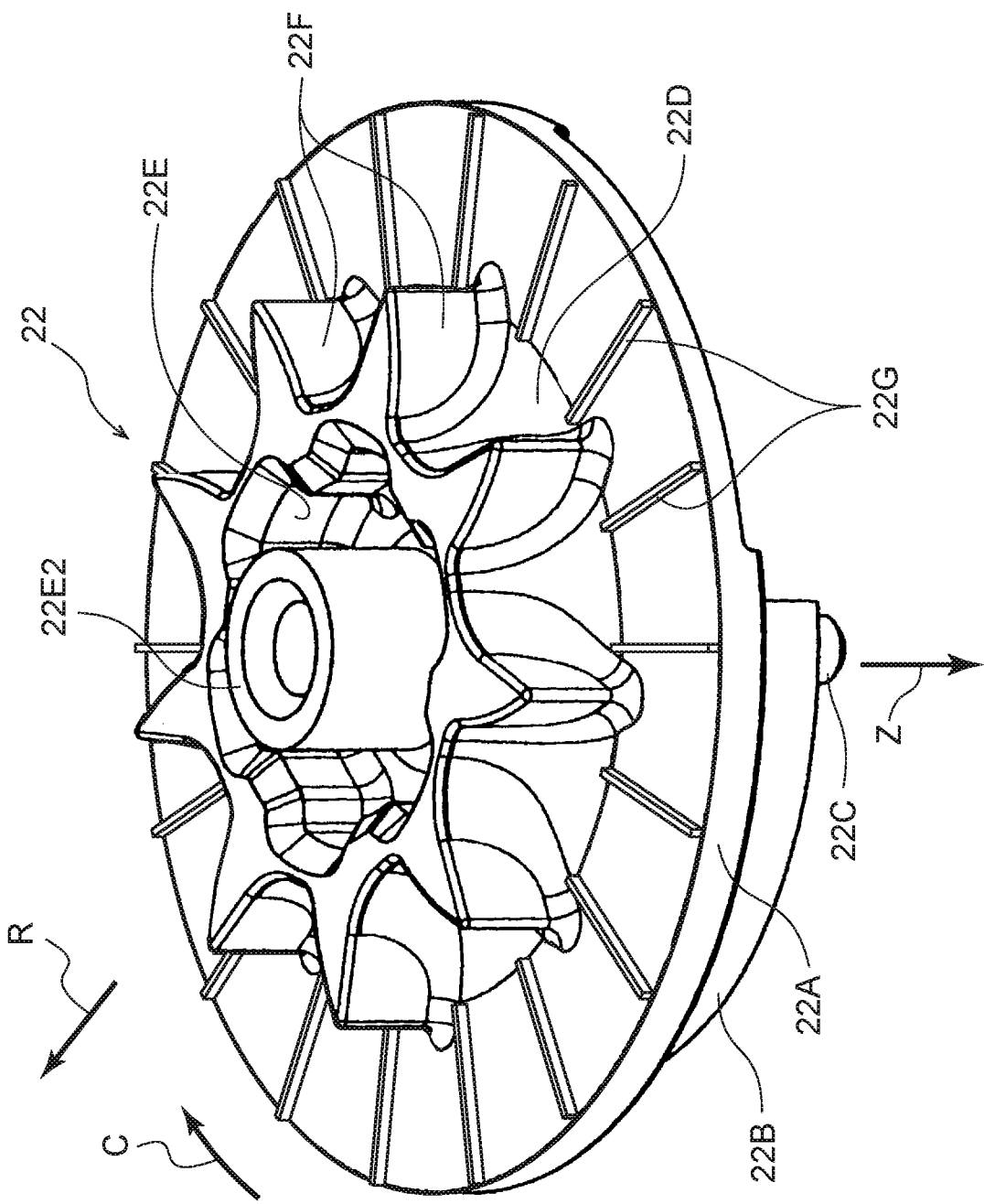
FIG. 7 is a perspective view, corresponding to FIG. 2, of a lock base according to an alternative mode viewed from the another axial direction side.

In the present exemplary embodiment, an example is described in which the lock base-side second engaging teeth 22G and the connecting member-side second engaging teeth 24I are gently curved in substantial "L" shapes, but the present invention is not limited thus. For example, as illustrated in FIG. 7, the lock base-side second engaging teeth 22G may extend linearly in diametric directions and the connecting member-side second engaging teeth 24I may extend linearly in diametric directions.

Hereabove, an exemplary embodiment of the present invention is described. The present invention is not limited by these descriptions and it will be clear that numerous modifications beyond these descriptions may be embodied within a technical scope not departing from the gist of the invention.

The disclosures of Japanese Patent Application No. 2017-200178 filed Oct. 16, 2017 are incorporated into the present specification by reference in their entirety.

The invention claimed is:

1. A webbing take-up device comprising:
a spool on which a webbing to be applied to a vehicle occupant is taken up, due to the spool rotating in a take-up direction; and
a rotor that is integrally rotatable with the spool, the rotor including: a pair of opposing portions disposed opposite to one another in a rotation axis direction of the spool, and axial direction engaging teeth that protrude from at least one of the pair of opposing portions toward a side thereof at which another of the opposing portions is disposed,
wherein the rotor is rotated and the spool is rotated in the take-up direction, due to a moving member moving and engaging with the axial direction engaging teeth, the moving member being formed in a rod shape of a softer material than the axial direction engaging teeth, the moving member passing between the pair of opposing portions, and the axial direction engaging teeth biting into the moving member while deforming a part of the moving member, whereby kinetic energy of the moving member is transferred to the rotor, and the rotor body is rotated.

2. A webbing take-up device comprising:
a spool on which a webbing to be applied to a vehicle occupant is taken up, due to the spool rotating in a take-up direction; and
a rotor that is integrally rotatable with the spool, the rotor including: a pair of opposing portions disposed opposite to one another in a rotation axis direction of the spool, and axial direction engaging teeth that protrude from at least one of the pair of opposing portions toward a side thereof at which another of the opposing portions is disposed,
wherein the rotor is rotated and the spool is rotated in the take-up direction, due to a moving member moving and engaging with the axial direction engaging teeth, wherein the rotor includes:
a connecting portion that links the pair of opposing portions in the rotation axis direction of the rotor; and
diametric direction engaging teeth that protrude from the connecting portion toward a rotation diameter direction outer side of the rotor, the moving member engaging with the diametric direction engaging teeth.

3. The webbing take-up device according to claim 2, wherein a protrusion height of the axial direction engaging teeth is smaller than a protrusion height of the diametric direction engaging teeth.

4. A webbing take-up device comprising:
a spool on which a webbing to be applied to a vehicle occupant is taken up, due to the spool rotating in a take-up direction; and
a rotor that is integrally rotatable with the spool, the rotor including: a pair of opposing portions disposed opposite to one another in a rotation axis direction of the spool, and axial direction engaging teeth that protrude from at least one of the pair of opposing portions toward a side thereof at which another of the opposing portions is disposed,
wherein the rotor is rotated and the spool is rotated in the take-up direction, due to a moving member moving and engaging with the axial direction engaging teeth, wherein:
recess portions are formed in the opposing portion at protrusion direction base end sides of the axial direction engaging teeth, the recess portions being indented toward an opposite side from a protrusion direction of the axial direction engaging teeth, and
when the moving member engages with the axial direction engaging teeth, portions of the moving member that are engaged with the axial direction engaging teeth are deformed.

* * * * *